Nov. 10, 1925.  1,560,932

J. EATON

THERMAL RESPONSIVE CIRCUIT CONTROLLER

Filed Aug. 27, 1923   2 Sheets-Sheet 1

Inventor:
John Eaton

Nov. 10, 1925.

J. EATON 1,560,932

THERMAL RESPONSIVE CIRCUIT CONTROLLER

Filed Aug. 27, 1923      2 Sheets-Sheet 2

Inventor:
John Eaton

Patented Nov. 10, 1925.

1,560,932

UNITED STATES PATENT OFFICE.

JOHN EATON, OF SCHENECTADY, NEW YORK, ASSIGNOR TO GENERAL ELECTRIC COMPANY, A CORPORATION OF NEW YORK.

THERMAL RESPONSIVE CIRCUIT CONTROLLER.

Application filed August 27, 1923. Serial No. 659,426.

*To all whom it may concern:*

Be it known that I, JOHN EATON, a subject of the British Empire, residing at Schenectady, in the county of Schenectady, State of New York, have invented certain new and useful Improvements in Thermal Responsive Circuit Controllers, of which the following is a specification.

My invention relates to improvements in thermal responsive circuit controllers, and one of the objects of the invention is to provide an arrangement whereby when the circuit controller has automatically operated, after an interval of time it will be automatically reset for another operation.

Another object of the invention is to provide an arrangement whereby the resetting is accomplished by a temporary energization of the resetting means.

A further object of the invention is the provision of an arrangement which is simple in construction and reliable in operation, and one whereby the controlled circuit is automatically and positively opened and reclosed depending on the thermal condition of a thermal responsive controlling element.

Another object of the invention is to provide a circuit controller which operates in response to the heating effect of a thermal responsive element to protect a controlled circuit from conditions caused by overloads of a minor nature which persist for time intervals regarded as unsafe, and in case the overload is of a greater value, the circuit controller will operate instantly regardless of the thermal condition of the thermal responsive element.

A still further object of the invention is to provide a thermal responsive circuit controller of the character indicated which will automatically operate a predetermined number of times and then have the further automatic operation temporarily arrested. Such protection is desirable for certain applications in which the repeated operation of the controller would indicate that there is a dangerous condition present in the controlled circuit which should be called to the attention of the operator.

Figure 1:
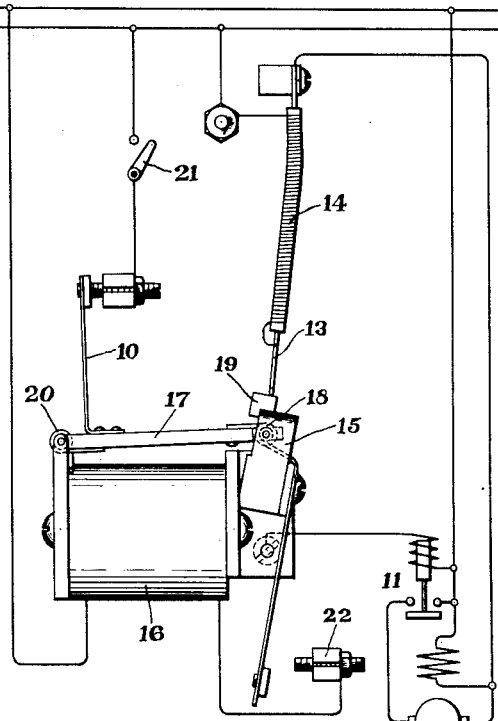
Figure 2:
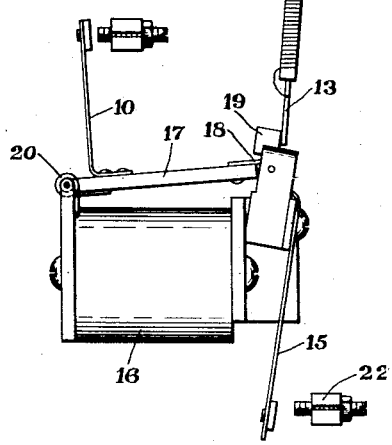
Figure 3:
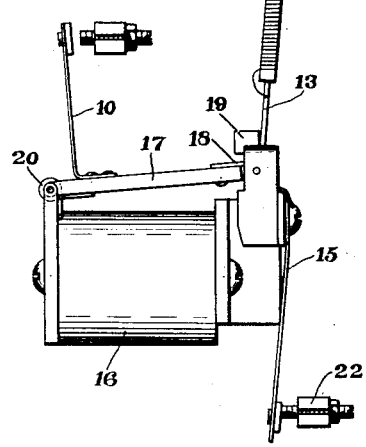
Figure 4:
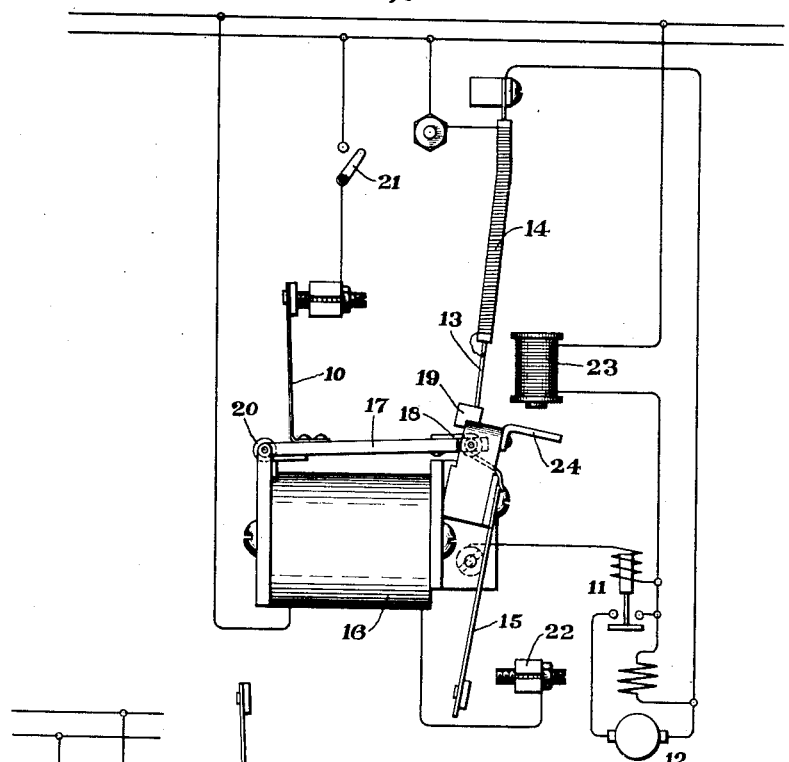
Figure 5:
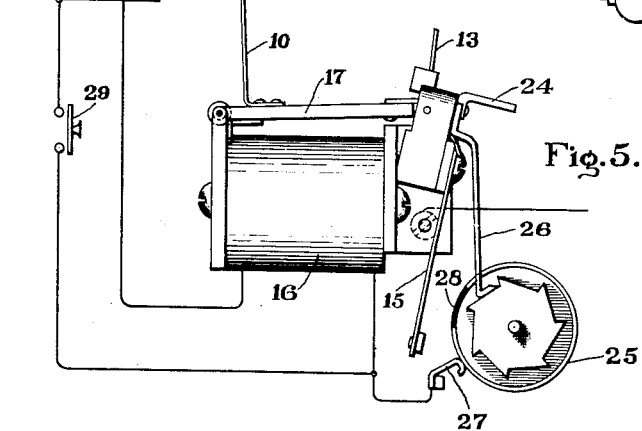

These and other objects of the invention, as will be apparent to those skilled in the art or as will be pointed out particularly hereinafter, are attained in the thermal responsive circuit controller illustrated in the accompanying drawings, in which Figure 1 is a simplified motor control diagram showing a controller in accordance with the invention; Fig. 2 is a detail of the controller with the parts of the same in their respective positions after the thermal responsive element has operated to open the controlled circuit; Fig. 3 is a similar detail showing the parts in their respective positions when the thermal responsive element has cooled and closed the circuit of the resetting electro-magnet preparatory to closing the controlled circuit; Fig. 4 is a very simplified motor control diagram in which the circuit controller is provided with means for instantly interrupting the controlled circuit in response to overloads in excess of the ordinary overloads for which the thermal responsive device gives protection; and Fig. 5 is a detail of a modification of the controller to provide for automatically arresting the automatic operation of the controller after a predetermined number of operations.

Referring to the drawings, the thermal responsive circuit controller comprises a switch member 10 for controlling the circuit of the line contactor 11 included in the armature circuit of an electric motor 12, the device which I have selected for illustration as a device to be protected by the controller. The switch member 10 is under the control of the thermal responsive element 13, which is indicated as of the bi-metallic thermostatic type, and which is arranged to be heated in any suitable manner, as by means of the heating coil 14 wound about and insulated from the bi-metallic strip of the thermostat. The heating coil of the thermal responsive element may be connected in the circuit of the motor 12 so as to be heated in accordance with the current taken by the motor. The thermal responsive element serves as a latch to hold the switch member 10 in the closed position, and one end of the element is securely held and the other end is arranged to make a sliding and abutting engagement with the pivotally mounted switch member 15 for controlling the electromagnet 16 which serves as the resetting means for automatically reclosing the switch member 10 after the thermal responsive element has operated to release the same. The switch member 15 is pivotally mounted on one end of the armature 17 of the electromagnet, and the switch member 15 is biased to the position shown in the drawing by the spring 18.

The arrangement in general is such that when the thermal responsive element or latch 13 is heated to a predetermined degree, the end of the latch will slide free from the post 19 and thus release the armature 17 to automatically move to the unattracted position due to the bias of the spring 20, and thus carry the switch member 10 to the open position. When the thermostatic latch has cooled, the switch member 15 is moved counter-clockwise about its pivotal support against the action of the spring 18 so as to cause this switch member to move to the closed position and thus temporarily energize the resetting electromagnet 16. The energization of the electromagnet 16 causes the armature 17 to be attracted so as to operate the switch member 10 to the closed position and bring the post 19 into abutting engagement with the end of the thermostatic latch so as to place the switch member 10 again under the control of the thermal responsive element. When the armature 17 is moved to the attracted position, the switch member 15 is permitted to interrupt the circuit of the resetting electromagnet so as to place the switch member 10 entirely under the control of the thermal condition of the element 13 and to have the resetting electromagnet deenergized as long as the conditions in the controlled circuit are normal.

As thus constructed and arranged, and with the various parts in their respective positions indicated in Fig. 1, the operation of my invention is as follows: In order to close the circuit for the motor 12, the pilot switch 21 will first be closed so as to energize the line contactor 11, the circuit being through the magnetic structure of the resetting electromagnet 16, the switch member 10, switch 21, and the winding of contactor 11. Contactor 11 is thus energized to close and connect the motor to the source of supply indicated. The heating coil 14 of the thermal responsive element is now connected in the motor circuit so that this element is heated in accordance with the thermal conditions of the motor circuit. In case an overload on the motor should persist for a predetermined length of time, the lower end of the thermostatic latch 13 will flex to the right and slide out of abutting engagement with the post 19. The armature 17 and the switch member 10 will thus be released to move counter-clockwise about the pivotal support for these members due to the action of the biasing spring 20. The parts of the circuit controller will now be in their respective positions shown in Fig. 2. By reason of the fact that the opening of the switch member 10 has interrupted the coil circuit of the contactor 11, the motor 12 will be automatically disconnected from the supply circuit and the heating coil 14 thereby deenergized so that the thermostatic latch is permitted to cool. The cooling of this latch will cause the lower end thereof to move clockwise so as to press against the right-hand side of the post 19 and thus move the switch member 15 counterclockwise into engagement with the stationary contact 22 against the action of the spring 18. The parts will now be in their respective positions indicated in Fig. 3. The closing of the switch member 15 will energize the electromagnet 16, through a circuit including the magnetic structure of the electromagnet 16, so as to attract the armature 17 and thus automatically close the circuit for the contactor 11 through the switch member 10. The post 19 is moved so as to come into abutting engagement with the end of the thermostatic latch, and the armature 17 and the switch member 10 are thus retained in their respective positions indicated in Fig. 1. The switch member 15 is permitted to interrupt the circuit for the winding of the resetting electromagnet 16 after the reclosing operation has been effected. This is due to the fact that the switch member 15 is biased to the position indicated in Fig. 1 by the action of the spring 18. The device is now ready for another operation to control the circuit of the electric motor to protect from conditions caused by overheating.

The arrangement of Fig. 4 is essentially the same as that indicated in Fig. 1, and the operation is also essentially the same. In order to protect the motor from instantaneous overloads of a higher value than the overloads for which the thermal responsive element is provided to give protection, the overload electromagnet 23 is included in the circuit of the electric motor. This overload electromagnet serves to attract an armature 24 secured to the switch member 15 so as to slide the post 19 out of abutting engagement with the end of the thermostatic latch 13 and thus effect the opening of the switch member 10 in the same manner as if the thermostatic latch had operated to effect the opening of the controlled circuit. The automatic reclosing of the controlled circuit will be effected in the same manner as previously described in connection with Fig. 1.

In Fig. 5 I have shown a detail of a modification in which the circuit controller is permitted to automatically operate a predetermined number of times and then have its automatic operation arrested. The electromagnet 16 is connected to be energized through the conducting segment 25 of a rotating member which is ratcheted step by step in the clockwise direction by the catch 26 connected to the switch member 15. The switch member 15 will complete a circuit for the winding of the resetting electromagnet through the conductor segment 25 and the contact finger 27 until the segment 25 has been ratcheted to the position at which the insulating segment 28 makes engagement with the contact finger 27. It will thus be impossible for the switch member 15 to complete the circuit for the resetting electromagnet so that the automatic reclosing of the switch member 10 will not be effected. The attention of the operator is thus called to the fact that there is some condition present in the motor circuit which requires his attention before again closing the motor circuit. After this condition is remedied, the operator may effect the closing of the controlled circuit by closing the push button 29 so as to energize the resetting electromagnet independently of the switch member 15. When the controller again operates to open the controlled circuit, the catch 26 will operate to rotate the insulating segment 28 out of engagement with the contact finger 27 and the contact carried by the end of the switch member 15 so that the controlled circuit will be automatically reclosed in the manner previously described.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. A thermal responsive circuit controller comprising a switch member movable to and from a closed position, a thermal responsive controlling element arranged to hold the switch member in one position while the thermal condition of the element is substantially normal and to effect the return of the switch member to the other position in response to the heating of the element beyond a predetermined degree, and means controlled by said element temporarily during the cooling thereof for operating the switch member to the position in which the member is held by the said element.

2. A thermal responsive circuit controller comprising a switch member movable to and from a closed position, electroresponsive means for operating the same from one position to the other, a thermal responsive controlling element arranged to hold the switch member in the operated position while the thermal condition of the element is substantially normal and to effect the return of the switch member in response to the heating of the element beyond a predetermined degree, and means controlled by said element temporarily during the cooling thereof for controlling the energization of said electromagnet.

3. A thermal responsive circuit controller comprising a switch member biased to one position, a thermal responsive controlling element for holding the same in a second position, and electroresponsive means temporarily energized responsively to the thermal condition of said element for operating the said switch member to the second position after the said element has released the switch member to return to the first position.

4. A thermal responsive circuit controller comprising a switch member biased to one position, an electromagnet for operating the switch member to a second position, and a thermal responsive controlling element for holding the said switch member in the second position while the thermal conditions of the controlled circuit are substantially normal, the said element arranged to release the said switch member to move to the first position when the thermal conditions of the controlled circuit become abnormal, and switch mechanism and connections whereby the said element temporarily controls the energization of the said electromagnet to return the said switch member to the second position an interval of time after the element has released the switch member.

5. A thermal responsive circuit controller comprising a switch member biased to the open position, a thermostatic latch arranged to hold the switch member in the closed position, and arranged to flex when heated and release the switch member to move to the open position, and electroresponsive means energized responsively to the cooling of the said thermostat for returning the said switch member to the closed position.

6. A thermal responsive circuit controller comprising a switch member biased to one position, electroresponsive means for operating the switch member to a second position, a thermal responsive controlling element for holding the switch member in the second position, and a switch operated responsively to the thermal condition of said element for controlling the said electroresponsive means to place the said switch member under the control of said thermal-responsive element.

7. A thermal responsive circuit controller comprising a switch member biased to one position normally deenergized, electroresponsive means which when energized operates the switch member to a second position, a thermal responsive element connected to be heated when the said switch member is in the second position for holding the switch member in the second position, and arranged when heated to a predetermined degree to release the switch member to move to the first position, and a switch operated by the said element during the cooling thereof for temporarily energizing the said electroresponsive means, to operate, the switch member to the second position.

8. A thermal responsive circuit controller, comprising a switch member biased to the open position, a normally deenergized electromagnet having a magnetic movable member connected to the switch member for operating the same to the closed position, a thermal responsive element arranged to hold the switch member in the closed position with the said electromagnet deenergized while the thermal condition of the element is substantially normal and to release the switch member to return to the open position when the element is heated to a predetermined degree, and a second switch member biased to the open position and connected to be operated to the closed position by the said element during the cooling thereof for temporarily energizing the said electromagnet to operate the first switch member to the closed position.

9. A thermal responsive circuit controller comprising a switch member, a normally deenergized electromagnet having a pivotally mounted armature biased to the unattracted position and connected to the switch member for operating the same to the closed position when energized, a thermostatic latch arranged to hold the switch member in the closed position and the said armature in the attracted position with the electromagnet deenergized while the thermal condition of the said element is substantially normal and to release the switch member to return to the open position and the said armature to return to the unattracted position when the element is heated to a predetermined degree, and a second switch member pivotally mounted on the said armature, biased to the open position, and connected to be operated to the closed position by the said element during the cooling thereof for temporarily energizing the said electromagnet to operate the first switch member to the closed position.

10. A thermal responsive circuit controller comprising a switch member biased to one position, a thermal responsive element arranged to be heated in accordance with the current in the circuit to be controlled for holding the switch member in the second position, and arranged to release the switch member when heated to a predetermined degree, electroresponsive means energized responsively to the thermal condition of the element for operating the switch member to the second position after the switch member is released to move to the first position, and an overload electromagnet for releasing the switch member independently of the operation of the said element.

11. A thermal responsive circuit controller comprising a switch member movable to and from a closed position, a thermal responsive element arranged to hold the switch member in one position while the thermal condition of the element is substantially normal and to effect the return of the switch member to the other position in response to the heating of the element beyond a predetermined degree, and means controlled by the cooling of said element for automatically operating the switch member a predetermined number of times to the position in which the member is held by the element and then arresting the further automatic operation of the switch member.

12. A thermal responsive circuit controller comprising a switch member movable to and from a closed position, a thermal responsive element arranged to hold the switch member in one position while the thermal condition of the element is substantially normal and to effect the return of the switch member to the other position in response to the heating of the element beyond a predetermined degree, means controlled by the cooling of said element for automatically operating the switch member to the position in which the member is held by the said element, and means controlled by the first mentioned means for limiting the number of times the first mentioned means is effective to automatically operate the said switch member to the said second position.

13. A thermal responsive circuit controller comprising a switch member biased to one position, a thermal responsive element arranged to be heated in accordance with the current in the circuit to be controlled for holding the switch member in the second position, and arranged to release the switch member when heated to a predetermined degree, electroresponsive means energized responsively to the thermal condition of the element for operating the switch member to the second position after the switch member is released to move to the first position, and means controlled by the said electromagnet for limiting the number of times the electromagnet is effective to automatically operate the said switch member to the said second position.

In witness whereof, I have hereunto set my hand this 24th day of August, 1923.

JOHN EATON.